Aug. 22, 1967  F. W. NEMOEDE ETAL  3,336,627
FERTILIZER SPREADER
Filed July 21, 1965
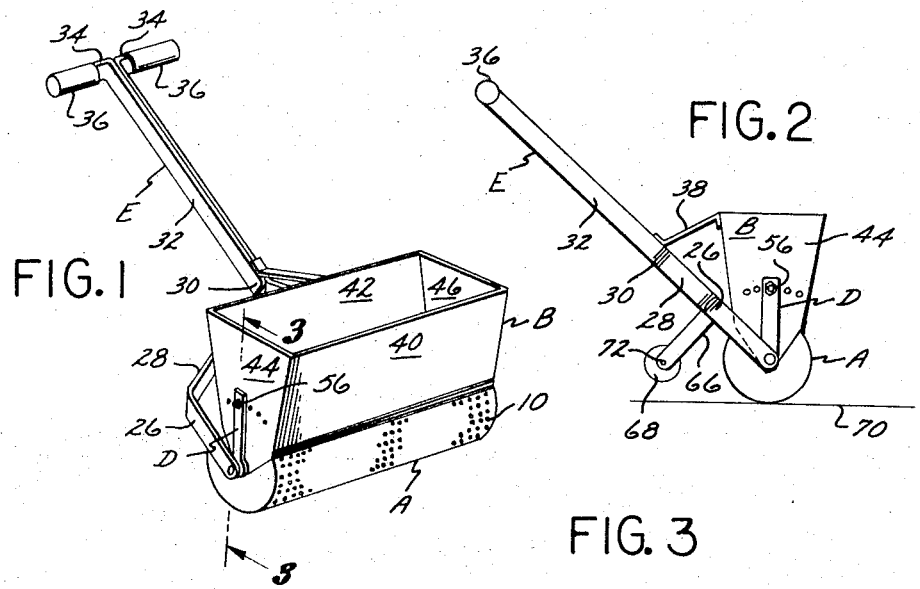
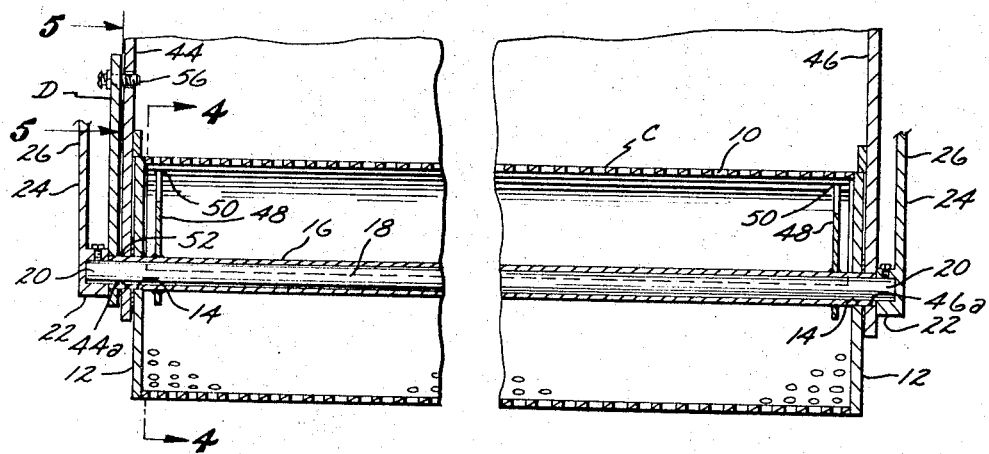
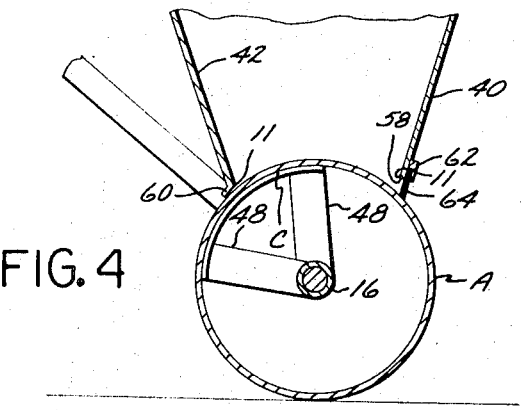
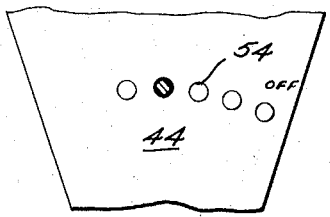
INVENTORS.
FRED W. NEMOEDE
J. ALLYN YATES
BY
William C. Babcock
ATTORNEY

United States Patent Office 3,336,627
Patented Aug. 22, 1967

3,336,627
FERTILIZER SPREADER
Fred W. Nemoede, 637 N. Friends Ave. 90601, and J. Allyn Yates, 7608 S. Duchess Drive 90606, both of Whittier, Calif.
Filed July 21, 1965, Ser. No. 474,216
8 Claims. (Cl. 15—575)

The present invention relates to a new and useful improvement in fertilizer spreaders, and more particularly to a hand-operated apparatus of this character.

A major object of the present invention is to provide a spreader that will uniformly distribute fertilizer or other material over the ground surface, is easily adjusted to distribute fertilizer or other material at a desired rate, is of simple mechanical structure, easy to operate, and will automatically discharge therefrom, foreign material such as small rocks, pieces of wood or the like that may be mixed with the fertilizer, without binding.

Another object of the present invention is to provide a fertilizer spreader that can be fabricated from standard commercially available materials which requires no elaborate plant facilities for the manufacture thereof, and requires a minimum of maintenance attention.

A still further object of the invention is to supply a fertilizer spreader that is relatively inexpensive, is efficient and reliable in operation, and is otherwise well adapted for the purpose for which it is intended.

These and other objects and advantages of the invention will become apparent from the following description of a preferred form thereof, and from the accompanying drawing illustrating that form in which:

FIGURE 1 is a perspective view of the spreader;
FIGURE 2 is a side elevational view of the device;
FIGURE 3 is an enlarged longitudinal cross-sectional view of the fertilizer distributing portion of the spreader, taken on the line 3—3 of FIGURE 1;
FIGURE 4 is a fragmentary transverse cross-sectional view of the fertilizer distributing portion of the device, taken on the line 4—4 of FIGURE 3; and
FIGURE 5 is a fragmentary, side elevational view of the spreader, taken on the line 5—5 of FIGURE 3.

With continuing reference to the drawing for the general arrangement of the spreader, it will be seen to include an elongate cylindrical shell A, preferably fabricated from a sheet metal, and in which a number of circumferentially and longitudinally spaced openings 10 are formed. A hopper B is located above the shell A, as can best be seen in FIGURE 1, into which the fertilizer (not shown) to be spread is dumped. A pivotally supported baffle C of arcuate transverse cross section is situated within the confines of shell A (FIGURE 4), and by adjustment relative to the lower open end of the hopper B, this baffle regulates the rate at which fertilizer (not shown) discharges from the hopper B through openings 10 into the shell A. The position of the baffle C relative to the lower open end 11 of the hopper B from which the fertilizer discharges is controlled by manual movement of an arm D, best shown in FIGURE 1. The hopper B and shell A are moved as an integral assembly in the spreading of fertilizer (not shown) by an elongate upwardly extending handle E as illustrated in FIGURES 1 and 2.

The two ends of shell A are closed by two circular end plates 12, in each of which two longitudinally aligned centrally disposed openings 14 are formed. The openings 14 rotatably engage an elongate tubular sleeve 16 that is substantially longer than the distance between the two openings. A shaft 18 of circular transverse cross section extends longitudinally through sleeve 16 and projects from the ends thereof. The sleeve 16 can be rotated relative to the shaft 18 when supported thereon, as shown in FIGURE 3.

The outer ends 20 of shaft 18 are removably engaged by end portions 22 of a yoke 24, which comprises two parallel straight sections 26, best seen in FIGURES 1 and 3. The rear ends of yoke sections 26 develop into inwardly tapering portions 28 that meet at an apex 30. At apex 30 the yoke portions 28 develop into two parallel, rearwardly extending sections 32 that define the handle E. Two legs 34 project in opposite directions from the rear ends of sections 32, and hand grips 36 are mounted on these legs.

A strap 38 extends forwardly from the lower portions of the handle sections 32 to the rear side wall of the hopper B, as illustrated in FIGURE 2. The strap 38 tends at all times to maintain the hopper B and the handle E in spaced relationship. The hopper B has a forward side wall 40 and a rear side wall 42 that taper downwardly and inwardly towards one another. The ends of side walls 40 and 42 are connected by first and second end pieces 44 and 46, respectively (FIGURE 2). Longitudinally aligned openings 44a and 46a are formed in end pieces 44 and 46 respectively, that rotatably engage the outer end portion of the sleeve 16, as best seen in FIGURE 3.

Within the confines of the shell A, two sets of radially spaced legs 48 extend upwardly from sleeve 16, and the outer end of these legs are rigidly connected by welding beads 50, or other conventional means, to the interior surface of the baffle C. The arm D is rigidly affixed to the left-hand end of sleeve 16 (FIGURE 3) by a welding bead 52, or other conventional fastening means, with the arm projecting upwardly adjacent the end piece 44, as shown in FIGURE 1. A number of arcuately spaced bores 54 are formed in the first end piece 44. Each of the bores 54 can be engaged by the end of a screw 56 that is rotatably mounted in the upper end portion of the arm D, as best shown in FIGURE 3. Instead of employing a screw, a spring-loaded pin (not shown) or other conveniently operable bore engaging means may be provided. By disengaging the screw 56 from one of the bores 54, the arm D can be pivoted manually, and as the arm pivots it rotates the sleeve 16 relative to the shaft 18, as well as the baffle C relative to the shell A (FIGURE 4).

Also in FIGURE 4 it will be seen that the more forwardly the baffle C is advanced towards the side wall 40, the smaller will be the area of the shell A that is in communication with the interior of the hopper B from which fertilizer (not shown) discharges through the openings 10 into the interior of the shell A to be subsequently distributed onto the ground. Thus, the position of the baffle C relative to the side piece 40 determines the rate at which the fertilizer (not shown) in the hopper B will pass downwardly into the shell A. The greater the quantity of fertilizer in the interior of the shell A, the greater will be the rate at which it will pass through openings 10 to be distributed on the ground surface.

The lower edge 58 of the forward side piece 20 is disposed a substantial distance above the exterior surface of the shell A, while the lower end of the rear side piece 42 develops into a downwardly and rearwardly extending lip 60 that is disposed adjacent the exterior surface of the shell to prevent any substantial quantity of the fertilizer (not shown) in the hopper from passing between lip 60 and the shell. A longitudinally extending bar 62 is affixed to the exterior surface of the side piece 40. Bar 62 supports a number of stiff bristles 64 that are in frictional contact with the exterior surface of the shell A. The bar 62 and bristles 64 cooperatively define a brush.

In the event small rocks, pieces of wood or the like (not shown) are mixed with the fertilizer in the hopper B, these foreign bodies will pass between the lower edge 58 and the exterior surface of the shell A, by momentarily bending the bristles 64 forwardly to permit the bodies to fall to the ground surface. Thus, foreign bodies are automatically discharged from the hopper B, and the possibility that the spreader might bind during operation due to these foreign bodies is minimized.

The use and operation of the invention are relatively simple. The hopper B is filled with fertilizer or other material to be distributed over the ground surface, and the arm D then pivoted to a position where the screw 56 is in alignment with one of the bores 54, with the selection of the bore being such as to place the baffle C in a position relative to the hopper B to permit discharge of the fertilizer into the shell A at a desired rate. The rate at which the fertilizer discharges into the shell A will be substantially the same at which the fertilizer is discharged from the shell through the openings 10 onto the ground surface.

After the screw 56 has been placed in alignment with the desired one of the bores 54, it is rotated to cause the shank portion thereof to engage this bore, with the arm D then being held in a fixed position relative to the side piece 44. When the arm D is so held in a fixed position relative to the end piece 44, the baffle C will likewise be held in a fixed position relative to the lower open end of the hopper B.

The handle is then raised to substantially the position shown in FIGURE 2, with the hands (not shown) of the user engaging the grips 36. Thereafter, the spreader is moved forwardly in a conventional manner, with the fertilizer discharging from the hopper B into the interior of the shell A, and from the shell through the openings 10 onto the ground surface.

After the fertilizer (not shown) has been spread, and a quantity still remains in the hopper B, the screw 56 is disengaged from the bore 54 in which it so disposed, and moved to the forwardmost of the bores (FIGURE 5), adjacent which the word "Off" is preferably imprinted on the end piece 44. When the screw 56 is caused to engage the "Off" bore 54, the baffle C is positioned where it extends between the forward side wall 40 and rear side wall 42 of the hopper B, and fertilizer will not be discharged from the device, provided it is moved over the ground surface in the manner hereinafter described.

Two transversely spaced rigid members 66 depend from the yoke 24, as best shown in FIGURE 2. Each member 66 rotatably supports a wheel 68 by conventional means such as a pin or shaft 72.

The wheels 68 are sufficiently small that they do not contact the ground surface 70 when the spreader is in the fertilizer dispensing position shown in FIGURE 2. When it is desired to stop spreading fertilizer, yet continue to move the spreader, the screw 56 is caused to engage bore 54 identified by the notation "Off," and the rear portion of the handle E then moved in a counter clockwise direction shown in the same figure to bring the wheels 68 into contact with the ground surface 70. Further downward movement of the rear portion of handle E in a counter clockwise direction brings the shell A up from the ground surface whereby the spreader can then be moved without dispensing fertilizer. When it is desired to again spread fertilizer, the operation above described is reversed.

Although the fertilizer spreader herein shown and described is fully capable of achieving the objects and providing the advantages hereinbefore mentioned, it is to be understood that it is merely illustrative of the presently preferred embodiment thereof and we do not mean to be limited to the details of construction herein shown and described, other than as defined in the appended claims.

We claim:
1. A fertilizer spreader, including:
 (a) a cylindrical shell having a plurality of spaced openings formed therein through which fertilizer can pass into the interior of said shell and therefrom onto a ground surface as said shell is rolled thereover;
 (b) two circular end plates that are affixed to and close the ends of said shell, with said end plates having aligned, centrally disposed openings formed therein;
 (c) a tubular sleeve that extends through said openings and rotatably supports said end plates thereon, which sleeve is substantially longer than said shell;
 (d) an elongate, transversely curved baffle disposed inside said shell and adjacent to an upper portion thereof;
 (e) first means for rigidly supporting said baffle from said sleeve;
 (f) a shaft extending through said sleeve to rotatably support the same, and projecting from the ends thereof;
 (g) a hopper having forward and rear side pieces that are connected by two end pieces, in which end pieces aligned openings are formed that rotatably engage end portions of said sleeve, with the lower edges of said side pieces being disposed adjacent to the exterior surface of said shell, and said hopper having a lower open end;
 (h) a yoke that engages the outer ends of said shaft;
 (i) an elongate handle connected to said yoke;
 (j) second means for so connecting said hopper to said handle that when said handle extends upwardly and rearwardly at a desired angle said hopper is substantially vertically disposed;
 (k) an arm rigidly connected to said sleeve and disposed adjacent to one of said end pieces of said hopper; and
 (l) third means for removably holding said arm at any one of a plurality of positions relative to said hopper, with said arm when in each of said positions disposing said baffle in a different position relative to said lower open end of said hopper to regulate the rate at which fertilizer in said hopper is discharged into said shell for distribution on the ground surface over which said shell rolls, with said baffle when in alignment with said lower open end obstructing communication between said hopper and the interior of said shell.

2. A fertilizer spreader as defined in claim 1 wherein the lower edge of said forward side wall is disposed outwardly from said shell a substantial distance, which spreader further includes:
 (m) fourth means extending downwardly from said lower edge of said forward side wall to permit foreign material in said hopper too large to be discharged through said openings in said shell to discharge through said fourth means as said spreader is moved forwardly.

3. A spreader as defined in claim 1 wherein said first means comprise a plurality of elongate members longitudinally spaced on said sleeve and rigidly affixed thereto which extend outwardly therefrom and are rigidly secured to said baffle.

4. A spreader as defined in claim 1 wherein said second means comprises a stiff strap that extends forwardly from said handle and is rigidly connected to said rear side piece.

5. A spreader as defined in claim 1 wherein said third means comprises an elongate member disposed in a direction normal to said arm that can be moved longitudinally relative thereto to removably engage any one of a plurality of arcuately spaced openings formed in said end piece of said hopper most adjacent to said arm.

6. A spreader as defined in claim 2 wherein said fourth means is a stiff brush that has the lower edge thereof adjacently disposed to the exterior surface of said sleeve.

7. A spreader as defined in claim 1 which further includes:
 (m) means for moving said spreader over the ground surface without rotating said shell.

8. A spreader as defined in claim 1 which further includes:
(m) two rigid members that depend from said yoke; and
(n) two wheels rotatably supported from said members, which wheels are sufficiently small in diameter as to be spaced above the ground surface when said handle is in a first position to push said shell over the ground surface, but with said wheels contacting the ground surface when said handle is moved into a second position lifting said shell above the ground surface, and said shell when so disposed above the ground surface cannot dispense fertilizer of said baffle is positioned to obstruct communication between said hopper and the interior of said shell.

References Cited
UNITED STATES PATENTS

| | | | |
|---|---|---|---|
| 1,390,383 | 9/1921 | Powell | 222—410 X |
| 1,859,625 | 5/1932 | Laing | 275—15 |
| 2,740,634 | 4/1956 | Mayfield | 111—10 X |
| 2,771,223 | 11/1956 | Ryan | 275—2 |
| 2,973,884 | 3/1961 | Peoples et al. | 222—177 |

ABRAHAM G. STONE, *Primary Examiner.*

J. R. OAKS, *Assistant Examiner.*